United States Patent
Haag et al.

(10) Patent No.: US 6,815,642 B2
(45) Date of Patent: Nov. 9, 2004

(54) APPARATUS AND METHOD FOR HEATING A STEERING WHEEL

(75) Inventors: Ronald Helmut Haag, Clarkston, MI (US); Mansour Ashtiani, Beverly Hills, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 10/232,649

(22) Filed: Aug. 30, 2002

(65) Prior Publication Data

US 2003/0111453 A1 Jun. 19, 2003

Related U.S. Application Data

(60) Provisional application No. 60/341,983, filed on Dec. 19, 2001.

(51) Int. Cl.[7] .............................. H05B 3/16; B62D 1/04
(52) U.S. Cl. ...................................... 219/204; 219/543
(58) Field of Search ................................. 219/204, 543, 219/544; 74/552, 558; 29/894.1, 620, 611

(56) References Cited

U.S. PATENT DOCUMENTS

| | | | | |
|---|---|---|---|---|
| 2,724,658 A | * | 11/1955 | Lytle ........................... | 219/543 |
| 2,835,777 A | * | 5/1958 | Gates et al. ................. | 219/204 |
| 3,349,722 A | * | 10/1967 | Davis ........................... | 219/543 |
| 3,851,150 A | * | 11/1974 | Holzen ........................ | 338/308 |
| 4,547,655 A | * | 10/1985 | Kurata et al. ................ | 219/204 |
| 4,631,976 A | * | 12/1986 | Noda et al. ................... | 74/552 |
| 4,724,305 A | * | 2/1988 | Iimura et al. ................. | 219/469 |
| 4,833,300 A | * | 5/1989 | Bard et al. .................... | 392/439 |
| 5,389,403 A | | 2/1995 | Buckley et al. | |
| 5,395,876 A | | 3/1995 | Frentzel et al. | |
| 6,015,586 A | | 1/2000 | Omori et al. | |
| 6,093,910 A | * | 7/2000 | McClintock et al. ......... | 219/217 |
| 6,172,342 B1 | | 1/2001 | Khafagy et al. | |
| 6,255,624 B1 | * | 7/2001 | Boaz et al. ................... | 219/219 |
| 6,392,195 B1 | * | 5/2002 | Zhao et al. ................... | 219/204 |
| 6,441,344 B1 | | 8/2002 | Bonn et al. ................... | 219/204 |
| 6,663,914 B2 | * | 12/2003 | Black ............................ | 427/8 |
| 2001/0003336 A1 | * | 6/2001 | Abbott et al. ................ | 219/543 |
| 2002/0008097 A1 | * | 1/2002 | Hobby ......................... | 219/204 |
| 2002/0096512 A1 | * | 7/2002 | Abbott et al. ................ | 219/543 |

FOREIGN PATENT DOCUMENTS

| | | | |
|---|---|---|---|
| DE | 29712839 | * | 9/1997 |
| GB | 2 285 729 | | 7/1995 |
| JP | 10-263472 | * | 10/1998 |

OTHER PUBLICATIONS www.achesonindustries.com (SP–029 Silver Plated Copper EMI Coating, Product Data Sheet).
www.achesonindustries.com (Electrodag 18DB70X VOC Exempt*Silver Conductive Coating, Product Data Sheet).

\* cited by examiner

Primary Examiner—John A. Jeffery
(74) Attorney, Agent, or Firm—Scott A. McBain

(57) ABSTRACT

A method of making a heated steering wheel comprises depositing an electrically conductive layer on at least a portion of a steering wheel substrate to produce thereon a heating element for receiving an electrical current and providing a source of heat. Also disclosed is a heating element for a steering wheel and a heated steering wheel assembly formed using this method.

28 Claims, 3 Drawing Sheets

APPARATUS AND METHOD FOR HEATING A STEERING WHEEL

CROSS REFERENCE TO RELATED APPLICATIONS

This application claims the benefit of U.S. Provisional Patent Application, No. 60/341,983, filed on Dec. 19, 2001, the contents of which are incorporated herein by reference thereto.

BACKGROUND OF THE INVENTION

A number of attempts have been made to provide a heated steering wheel to alleviate touching of a cold steering wheel by a driver, especially during cold weather.

Previous approaches involved the use of a length of resistance wire as a heating element, either embedded within the steering wheel, within a protective sheath, and/or extending within a hollow steering wheel. An electrical current is then arranged to pass through the resistance wire. However, various factors effect the utility of these arrangements, including the inherent complexity required in applying the heating element, along with the major structural modifications required within the steering wheel itself, all of which add cost to the manufacture.

Assembling a heating steering wheel can be labor intensive due to the complex three-dimensional shape of modern steering wheels and the poor elongation characteristics of heating elements. Imperfections in the outer surface of the steering wheel, some of which are artifacts of the process used to form it, can effect performance. For example, the so-called parting line from molding the steering wheel may serve as a wear point where abrasion of a heating element occurs during normal use.

SUMMARY OF THE INVENTION

Provided for herein is a method of making a heated steering wheel comprising depositing an electrically conductive layer on at least a portion of a steering wheel substrate to produce thereon a heating element for receiving an electrical current and providing a source of heat.

Also disclosed is a heating element for a steering wheel comprising an electrically conductive layer deposited on at least a portion of a steering wheel substrate arranged to receive an electrical current and to provide a source of heat.

Further disclosed is a heated steering wheel assembly comprising an electrically conductive layer deposited on at least a portion of a steering wheel substrate to produce thereon a heating element for receiving an electrical current and providing a source of heat; and a second layer deposited over at least a portion of said heating element.

Preferably, the heating element disclosed is easily applied directly to the outer surface of a steering wheel substrate. Also preferably it is disposed over the entire surface to be heated so as to provide a smooth outer surface in that the outer surface is essentially free from defects present in the underlying substrate.

The above-described and other features and advantages of the present invention will be appreciated and understood by those skilled in the art from the following detailed description, drawings, and appended claims.

BRIEF DESCRIPTION OF THE DRAWINGS

The present invention will now be described, by way of example, with reference to the accompanying drawings, in which:

FIG. 3A is an enlarged portion of FIG. 3;

FIG. 6 is a cross sectional view of FIG. 5, section A.

DETAILED DESCRIPTION OF THE INVENTION

Figure 1:
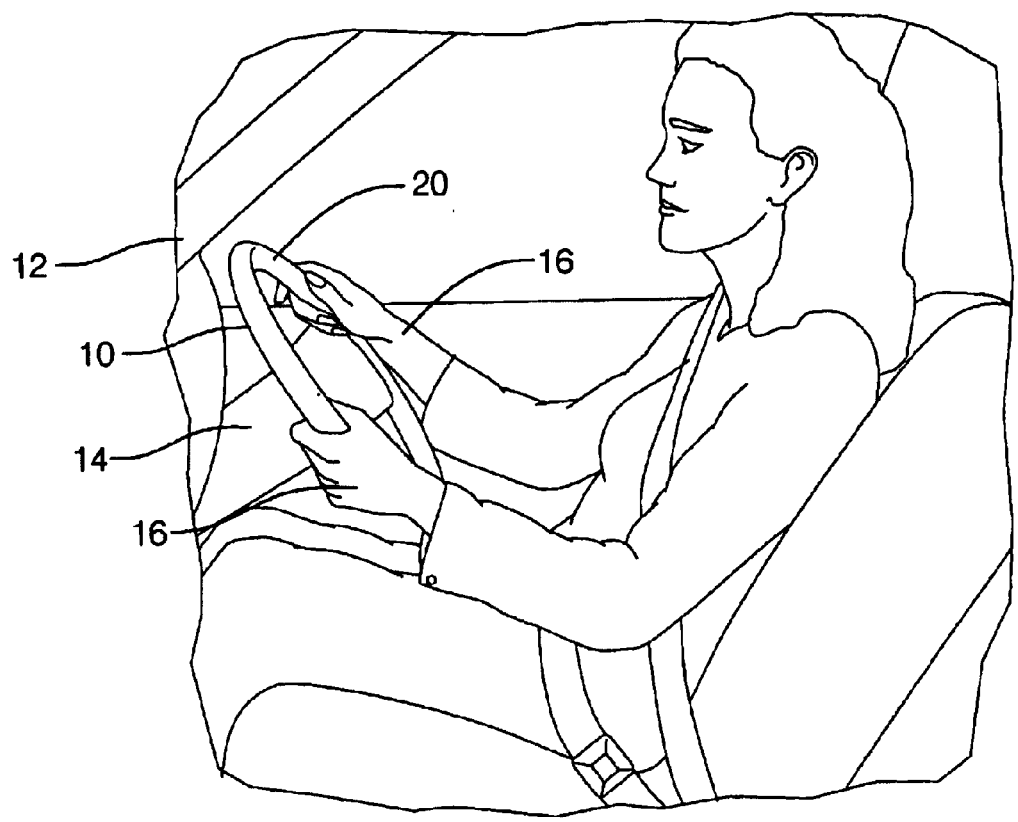
FIG. 1 is a perspective view of a heated steering wheel, according to one embodiment of the present invention, illustrated in operational relationship with a vehicle.

Referring now to FIG. 1, one embodiment of a heated steering wheel 10 is illustrated in an operational configuration inside a partially shown vehicle, generally designated at 12. Heated steering wheel 10 is operably connected to a steering mechanism 14. Heated steering wheel 10 is gripped by an operator's hand 16 to guide vehicle 12 in a desired direction. Advantageously, heated steering wheel 10 warms up the operator's hands 16 when the ambient temperature is cool.

Figure 2:
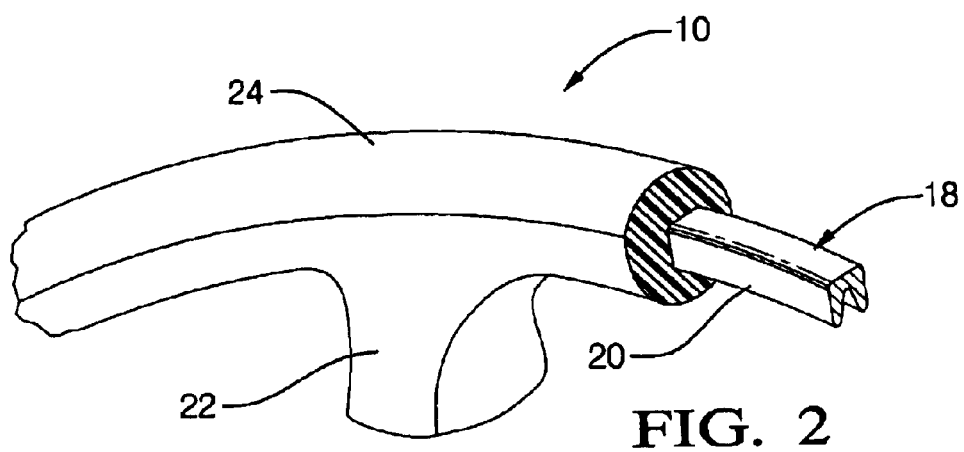
FIG. 2 is a cross-sectional view of a portion of a steering wheel.
Figure 3:
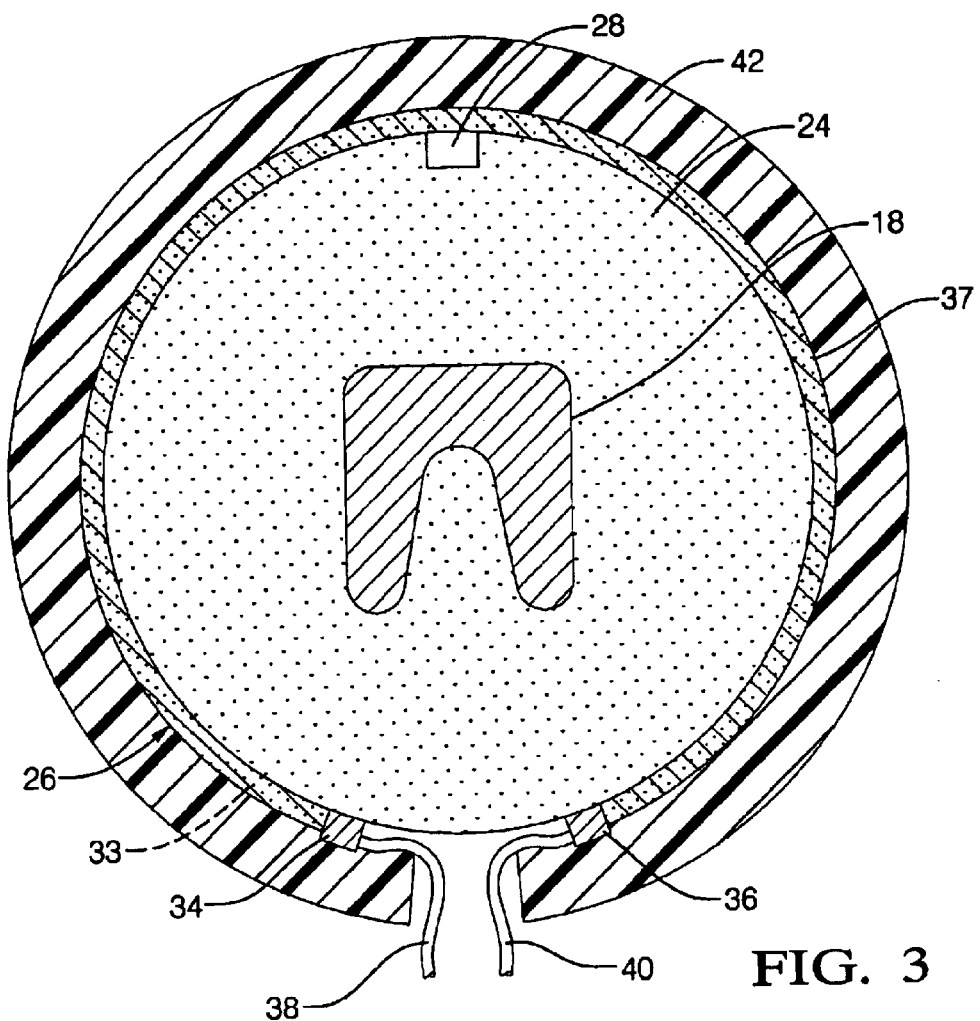
FIG. 3 is a cross-sectional view of a heated steering wheel.
Figure 3:
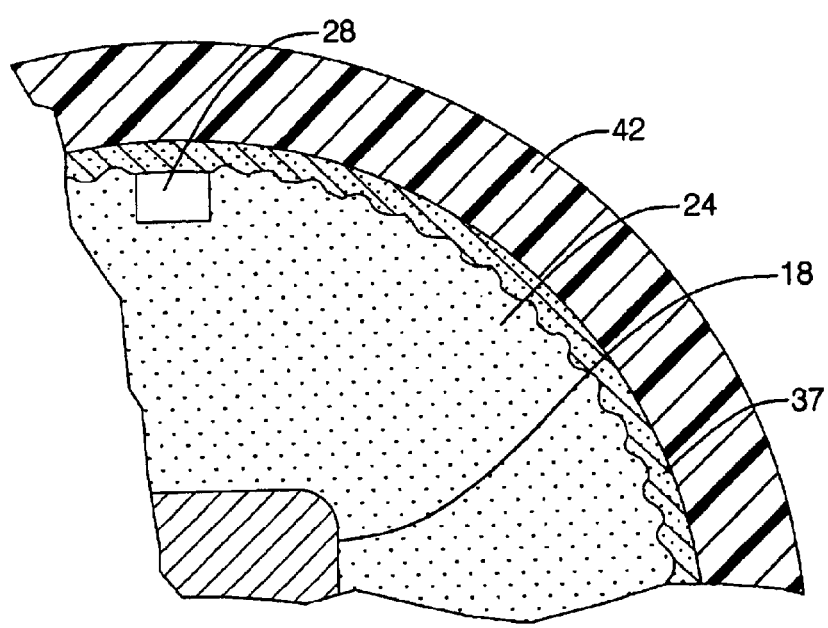

Referring now to FIGS. 2 and 3, heated steering wheel 10 includes a frame portion 18 that defines the shape of the heated steering wheel 10. Preferably, frame portion 18 is made from a metal material such as magnesium. Frame portion 18 includes an inner rim (not shown), an outer rim 20 circumscribing inner rim, and at least a spoke 22 interconnecting the inner rim with outer rim 20. The inner rim, outer rim 20, and spoke 22 form an integral frame portion 18 for heated steering wheel 10.

Heated steering wheel 10 also includes a support member 24 that encloses frame portion 18, preferably around outer rim 20 and over spokes 22. Support member 24 may be a flexible cushion member such as a polymeric foam. Alternatively, support member 24 may be a rigid member, such as a polymeric resin (e.g., plastic).

Heated steering wheel 10 also includes a heating element 26. The heating element 26 is deposited directly on the support member 24 and preferably positioned such that it is in electrical contact with a first bus bar 34 and a second bus bar 36 attached to, inlaid, and/or deposited on support member 24. The bus bars are in turn connected to an electrical source through, for example, a first terminal wire 38 and a second terminal wire 40, which provides electrical current to the conductive heating element 26 to provide heat. The bus bars and terminal wires attached to the bus bars, as well as any desired temperature sensing heat output control device 28, such as a thermistor, are positioned in contact with the heating element 26.

The heating element comprises an electrically conductive layer 26 deposited directly on the surface of support member 24. The electrically conductive layer 26 is comprised of an electrically conductive material, which may include metal, electrically conductive carbon including carbon and/or graphite particles, fibrils, fibers, micro-tubes, and a combination comprising at least one of the foregoing. Also included are metal coated carbon and/or graphite particles, fibrils, fibers, micro-tubes, and a combination comprising at least one of the foregoing. The preferred electrically conductive material for use herein is also thermally conductive. More preferred are conductive layers comprising copper, silver, nickel, alloys of one of the foregoing, and combinations comprising at least one of the foregoing metals.

In one embodiment, the electrically conductive layer is formed from a curable electrically conductive ink comprising an electrically conductive material and a curable medium deposited directly on support member 24. The term "curable, cured, and curing" as used herein with regard to the electrically conductive ink, refers to any appropriate drying, reacting, crosslinking, solidification, evaporation of solvent, and the like required to convert the electrically conductive ink into a dry, preferably non-tacky state. These include air-drying, heat curing, curing through irradiation including, for example through exposure to UV light, and the like.

The curable medium may comprise a resin, preferably one selected from the group consisting of thermosetting resins, elastomeric resins, thermoplastic resins, and combinations comprising at least one of the foregoing. Suitable thermosetting resins for use herein include alkyds, diallyl phthalates, epoxies, melamines, phenolics, polyesters, urethanes, rigid silicones, and the like. Suitable elastomeric resins include acrylates, butyls, chlorosulfonated polyethylene, fluorocarbons, fluorosilicones, polysulfides, polyurethanes, neoprenes, nitrites, silicones, styrene, butadienes, and the like. Suitable thermoplastic resins include acetates, acrylics, cellulosics, chlorinated polyethers, fluorocarbons, nylons (polyamides), polycarbonates, polyethylenes, polypropylenes, polyimides, polyphenylene oxides, polystyrenes, polysulfones, vinyls, and the like. The preferred curable medium being acrylics.

Preferably the electrically conductive material is dispersed in an ink as a finely divided particle, powder, and/or flake. More preferably, the electrically conductive material is dispersed within the ink to form an essentially uniform mixture, admixture and/or composition that is readily sprayed to form an essentially uniform layer on a substrate. The ink may also include a solvent, a drying retarding agent, a surfactant, a viscosity modifying agent, or a combination comprising at least one of the foregoing. Suitable solvents for use herein include both water and organic solvents. For example, a curable conductive ink comprising a silver and copper mixture such as Electrodag SP-029, Electrodag 18DB70X (both available commercially from Acheson Colloids Company, Port Huron, Mich., U.S.A.), or the like may be used.

The materials used for this process may be mixtures that are commercially available and used for EMI shielding processes (i.e., highly conductive materials/coatings made up of a carrier/binder with silver/copper pigments. The EMI material has never been used for this purpose. In addition, we have discovered combinations of these mixtures along with other pigments such as beryllium or electrically conductive carbons.

A sample material that works for a coated, heated steering wheel is a highly conductive silver-plated copper shielding coating designed to be spray applied onto electronic enclosures. This material is commercially available from Acheson Colloids Company and is identified as SP-029. This material exhibits low electrical resistance characteristics at a thin dry film thickness and has excellent cohesion and adhesion properties and provides robust shielding performance.

Typical properties of this sample (as supplied) are:
Pigment: silver plated copper,
Binder: thermoplastic,
Weight solids: 35.0%,
Diluent: denatured ethanol,
Density: 9.8 lbs/gal @ 1 mil (1.18 kg/l @ 25 $\mu$m),
Theoretical coverage: 168 sq ft/gal @ 1 mil (3.52 m$^2$/kg @ 25 $\mu$m), (4.12 m$^2$/l @ 25 $\mu$m),
Viscosity: 500 cps.
Typical properties (as sprayed) are
VOC: 6.13 lb/gal (735 g/l)
Drying time: 5 minute air dry followed by 30 minute cure at 160° F. (71° C.)
Recommended dry film thickness: 0.4–0.8 mils (10 to 20 $\mu$m).
Typical properties (when dried) are
Resistivity: 0.020–0.50 ohms/sq/mil.

Another sample material that works for a coated, heated steering wheel is ELECTRODAG 18DB70X a conductive coating used for EMI/RFI shielding protection. This material is also commercially available from Acheson Colloids Company.

Typical properties of this sample (as supplied) are:
Pigment: silver,
Binder: acrylic,
Weight solids: 50.8%±0.5%,
Density: 13.9 lbs/gal (1.6 kg/l),
Theoretical coverage: 318 sq ft/gal (4.69 m$^2$/kg)
Typical properties (as sprayed) are
VOC: 59.6 g/l (0.5 lb/gal)
Diluent: acetone (recommend starting at 1:1 ratio by volume)
Drying time: 5 minute air dry to touch/10 mm to handle then 5 mm @ 180°–225° F. (82°–107° C.) or air cure for 24 hr
Recommended thickness: 0.5–1.5 mils dried (12.5–37.5 $\mu$m).
Typical properties (when dried) are
Sheet resistance: 0.015 ohms/sq/mil (25 $\mu$m),
Attenuation: 75 dB.

Important to providing an appropriate amount of heat energy, is the surface resistivity of the electrically conductive layer. Suitable levels of surface resistivity depend on the total surface area required, the amount of heat required, and the voltage applied to produce the heat. Preferably, the heating element has an average surface resistivity of less than or equal to about 2 ohms based on an operational voltage of 14 volts, an average power requirement of 100 Watts.

Also important in providing the required amount of heat energy is the thickness of the conductive layer. Preferably, the thickness for the conductive layer will provide less than or equal to about 2 ohms of resistance as measured above (i.e., at 14 volts and 100 Watts), distributed over the surface being coated. The entire steering wheel may be heated, but there are also positions on the steering wheel more prone to be in contact with the drivers hands at any one point in time, especially when the vehicle is first placed into operation. These positions include those commonly referred to as the 10 and 2 positions, so named to correspond to the location of those same numbers on a clock face.

A non-uniform heat load may be applied to these, or other discrete positions on the steering wheel such that the resistivity local to those positions is varied by varying the thickness of the conductive layer to form localized heat zones. These heat zones result from the increased power dissipated from the thinner areas as compared to the thicker areas, both of which are simultaneously provided with the same amount of current.

The method by which the conductive layer is applied to the surface of the steering wheel needs to be suitable to form a continuously conductive layer over the desired portion of the steering wheel support member. Suitable methods of deposition include dipping, spray coating, gas assisted spray coating, electrospray coating, powder coating, screen printing, ink jet printing, electrostatic printing, and the like.

Figure 4:
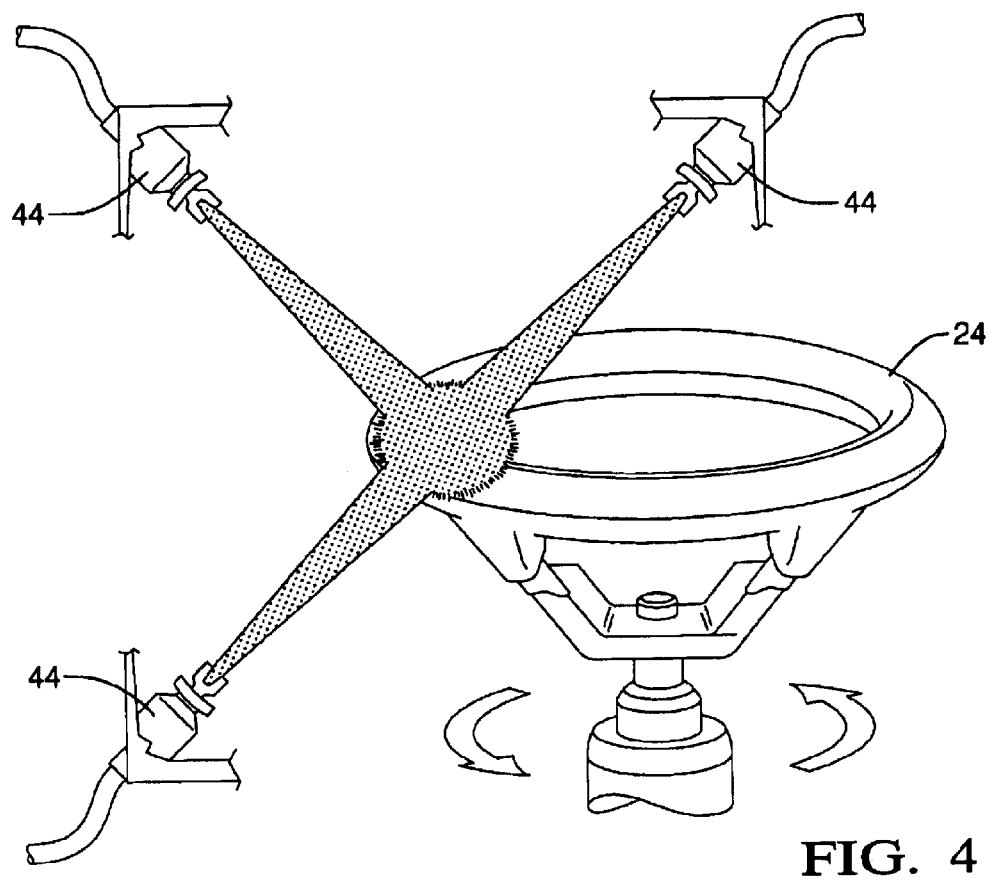
FIG. 4 is a perspective view of a method of spray depositing a heating element onto a steering wheel.

In accordance with an exemplary embodiment, the conductive layer is spray coated upon the exterior surface of support member 24. Referring to FIG. 4, the spray coating deposition process includes application of the conductive layer from at least one stationary spray nozzle 44, while rotating the steering wheel support member to be coated. In yet another alternative embodiment, the position of spray nozzles 44 may be varied while the support member 24 is held in a stationary position. Combinations including these two approaches are also envisioned for use herein. In the event only a portion of the steering wheel support member is to be coated, various portions of the support member may be masked prior to deposition or in the alternative, the deposition occurs through printing, spraying and other techniques capable of providing the layer of conductive material where needed, without masking, and with a minimal amount of over spray. Examples of suitable printing processes include gas (e.g., air) assisted spraying which directs the sprayed material onto the surface with minimal if any amount of waste.

The conductive layer may be a single layer of conductive material, or in the alternative may include a plurality of layers, at least one of which is electrically conductive. This plurality of layers may also include protection layers applied to provide resistance to wear and abrasion, protection from liquids, or a combination comprising at least one of the foregoing properties to the steering wheel. These layers may be applied to the steering wheel substrate prior to and/or after the conductive layer has been applied.

Figure 5:
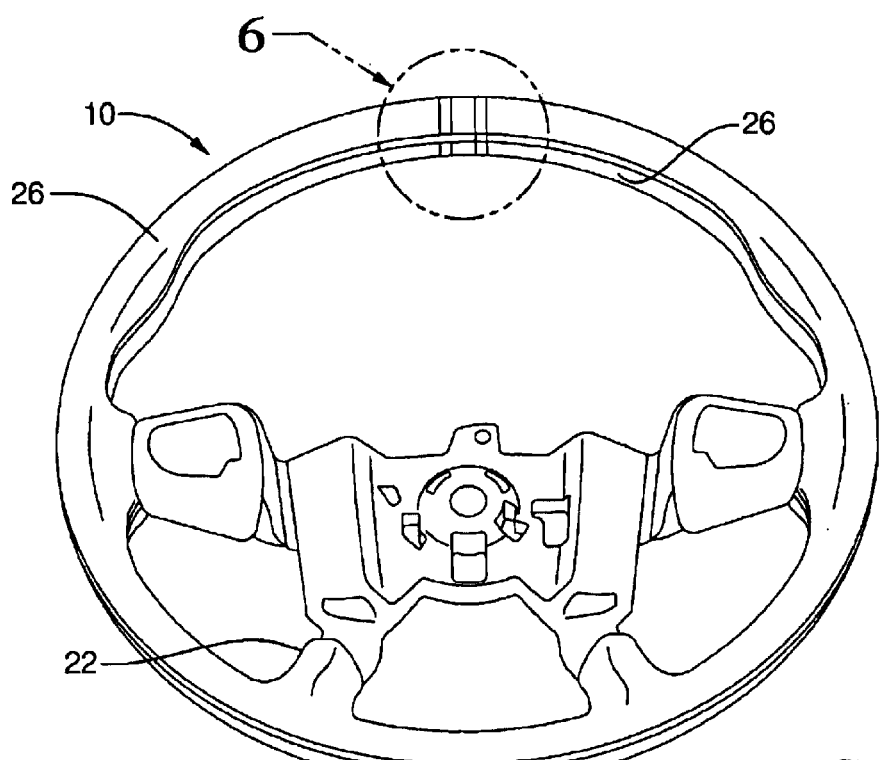
FIG. 5 is a perspective view of a heated steering wheel having inlaid bus bars.

In order to provide heat, the heating element must be supplied with electrical power. The electrical power may be supplied to the heating element through end wires arranged in connection with the heating element. Also, the electrical power may be supplied through bus bars arranged on and/or in the steering wheel support as shown in the embodiment of FIGS. 5 and 6. In this embodiment, the first and second bus bars 34 and 36 are inlaid into the steering wheel support member 24. Electrical connection from these bus bars to the conductive coating is supplied through first and second end connectors 30 and 32 respectively. The attachment of the end connectors to the bus bars may be by way of soldering, crimping, welding or the like, and need only provide an adequate amount of electrical contact to conduct the needed power. Also, the bus bars may be affixed to the steering wheel support, molded into the steering wheel support, but are preferably spray deposited onto the steering wheel in a manner similar to that of the conductive layer deposition. The first and second bus bars are then put into electrical contact with the power source through first and second terminal wires 38 and 40.

The heating element must make contact to the bus-bars which are the current carrying elements. The bus-bars are usually copper or nickel coated copper. The bus-bars could be insert molded into the wheel or may be also sprayed directly over the heating element at the termination points. If sprayed, a connection method (i.e., solder weld) must be done to connect the power wires. In either case, the steering wheel rim must accommodate for the height of the bus bars (power carriers) so that the outer diameter of the rim is smooth and flush.

In another embodiment, a control device for controlling the heat output or temperature of the heating element may also be incorporated. For example, a thermistor arranged in thermal contact with the heating element may be disposed in electrical connection with the power supply to regulate the output of the heating element. One example of such a controller is illustrated in U.S. Pat. No. 6,172,342, filed on Sep. 15, 1999, the contents of which are incorporated herein by reference thereto.

Once the heating element 26 is deposited over the surface of the support member 24, it is capable of providing heat to the support member, and/or to a second layer 42 disposed over heating element 26 (see FIG. 3). Second layer 42 can provide the exterior surface of heated steering wheel 10, which is gripped by operator's hands 16, and may also provide a decorative appearance to heating steering wheel 10. It should be appreciated that second layer 42 may be made from a combination of materials to achieve the desired decorative appearance. For example, a portion of second layer 42 covering outer rim 20 and spoke 22 may be a material such as leather, while a portion of the second layer 42 covering the inner rim may be a material such as plastic. It may be applied to the assembly through spraying and/or dipping in a manner similar to the application methods of the conductive layer. In the case of leather or cloth, the second layer 42 may be sewn and/or wrapped around the steering wheel support.

Advantageously, the deposited heating element provides for the elimination of irregularities and protrusions, collectively referred to as imperfections, associated with conventional heating elements. Such imperfections include pockmarks, bubbles, processing marks and artifacts, and the so-called parting line, which is an artifact of the molding process by which the steering wheel substrate was formed. The presence of such imperfections within the steering wheel substrate provides a point source where excessive wearing of the heating element can occur during normal use. Also, imperfections can be seen through exterior (e.g., leather) coverings resulting in a non-aesthetically pleasing assembly. FIG. 3A illustrates a non-uniform surface of the steering wheel substrate. It should be appreciated that the deposited heating element may be applied to a variety of wheel designs such as a leather-wrapped design, or a two-shot, molded polyurethane design. It is also suitable for two-, three-, and four-spoke designs.

The deposited heating element provides for easy assembly of the element during the manufacturing process of the heated steering wheel. Instead of applying a heating element directly on the steering wheel with adhesive or other means, the deposited heating element allows for a quick, accurate, and less damaging assembly on the heated steering wheel, especially in areas like the finger forms and spoke areas, unlike traditional heating elements that may require stretching in these areas. Thus, the assembly of the heated steering wheel is less labor intensive. Also, the preformed heating element can be fully tested prior to assembly and production of the final steering wheel assembly.

There are several patterns of heating elements that may be applied to the steering wheel rim. The reasons for the pattern alternatives are two-fold. Firstly, on most polyurethane wheels, there is almost always a parting line on the rim which may cause the element coaxing to be non uniform or have voids in the element itself This may cause hot spots or arcing if the rim is flexed. FIGS. 5 and 6 show a pattern of two elements in series to avoid depositing the element at the parting lines. The second reason for this type of pattern is to provide some room at the inner parting line to prevent the leather wrapping sewing process from causing damage to the heating element.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method of making a heated steering wheel, comprising:
   providing a steering wheel with a non-conductive substrate material having a non-uniform surface;
   spraying an electrically conductive layer on at least a portion of said substrate material to produce thereon a heating element for receiving an electrical current and providing a source of heat, said electrically conductive layer comprising a silver plated copper pigment and a thermoplastic binder;
   providing a bus bar to provide an electrical connection to said electrically conductive layer, wherein said electrically conductive layer is applied in a manner to accommodate said non-uniform surface and said bus bar such that a smooth surface is provided.

2. The method of claim 1, wherein said spraying includes spray coating, gas assisted spray coating, electrospray coating, powder spray coating, or a combination comprising at least one of the foregoing, said electrically conductive layer on said substrate material.

3. The method of claim 1, wherein said electrically conductive layer comprises a plurality of layers, at least one of which is electrically conductive.

4. The method of claim 3, wherein at least one of said plurality of layers is a protective layer.

5. The method of claim 1, further comprising providing a thermistor for controlling the heat output of said heating element.

6. The method of claim 1, wherein said electrically conductive layer has a non-uniform thickness.

7. The method as in claim 1, further comprising applying a layer of leather about said smooth surface.

8. The method as in claim 1, wherein said bus bar is spray applied on at least a portion of said substrate material prior to the application of said electrically conductive layer.

9. A heated steering wheel assembly, comprising:
   an electrically conductive layer spray deposited on at least a portion of a non-uniform steering wheel substrate to produce thereon a heating element for receiving an electrical current and providing a source of heat, said heating element being applied in a manner to provide a smooth outer surface while being applied to said non-uniform steering wheel substrate; and
   a second layer deposited over at least a portion of said heating element, wherein said electrically conductive layer comprises a silver pigment and an acrylic binder.

10. The assembly of claim 9, wherein said second layer comprises leather.

11. The assembly of claim 9, further comprising a control device for controlling the heat of said heating element.

12. The assembly of claim 11, wherein said control device comprises a thermistor disposed in thermal contact with said heating element.

13. The heated steering wheel assembly as in claim 9, wherein said electrically conductive layer is a single layer.

14. The heated steering wheel assembly as in claim 9, further comprising at least one bus bar disposed on said steering wheel insert prior to the spraying of said electrically conductive layer, wherein said electrically conductive layer is in electrical contact with said at least one bus bar.

15. The heated steering wheel assembly as in claim 9, wherein said outer layer conforms to said smooth outer surface of said electrically conductive layer.

16. A method providing a heated steering wheel, comprising:
   forming a conductive layer about a portion of a steering wheel insert by spraying an electrically conductive layer on said portion of said steering wheel insert, said conductive layer comprising a silver plated copper pigment and a thermoplastic binder, wherein said electrically conductive layer also being capable of providing EMI shielding;
   covering said conductive layer with an outer decorative layer, wherein said outer decorative layer is capable of being heated by passing an electrical current through said conductive layer.

17. The method as in claim 16, further comprising:
   positioning at least one bus bar on said portion prior to the step of spraying.

18. The method of claim 17, wherein said at least one bus bar is spray applied on to said portion.

19. The method as in claim 16, further comprising:
   rotating said steering wheel insert during the step of spraying.

20. The method as in claim 19, wherein said electrically conductive layer is sprayed from at least one stationary nozzle.

21. The method as in claim 19, further comprising:
   positioning at least one bus bar on said portion prior to the step of spraying.

22. The method as in claim 21, wherein said electrically conductive layer is a single layer.

23. A method of making a heated steering wheel, comprising:
   providing a steering wheel insert with a non-conductive substrate material having a non-uniform surface;
   spraying an electrically conductive layer on at least a portion of said substrate material to produce thereon a heating element for receiving an electrical current and providing a source of heat;
   providing a bus bar to provide an electrical connection to said electrically conductive layer, wherein said electrically conductive layer is applied in a manner to accommodate said non-uniform surface and said bus bar such that a smooth surface is provided, wherein said electrically conductive layer comprises a silver pigment and an acrylic binder.

24. The method as in claim 23, wherein the step of spraying further comprises: rotating said steering wheel insert when said electrically conductive layer is being applied to said substrate material.

25. The method as in claim 23, further comprising:
   applying a second outer layer to said smooth surface wherein said second outer layer is a material that conforms to said smooth surface of said electrically conductive layer.

26. A method of making a heated steering wheel, comprising:

providing a steering wheel insert with a non-conductive substrate material having a non-uniform surface;

spraying an electrically conductive layer on at least a portion of said substrate material to produce thereon a heating element for receiving an electrical current and providing a source of heat, said electrically conductive layer;

providing a bus bar to provide an electrical connection to said electrically conductive layer, wherein said electrically conductive layer is applied in a manner to accommodate said non-uniform surface and said bus bar such that a smooth surface is provided, wherein said non-conductive substrate material is polyurethane and said electrically conductive layer comprises two elements disposed in a manner to avoid deposition of said electrically conductive layer on a parting line of said substrate material.

27. The method as in claim 26, wherein said bus bar is a pair of bus bars each being positioned for electrical connection with one of said two elements.

28. A heated steering wheel assembly, comprising:

an electrically conductive layer spray deposited on at least a portion of a non-uniform steering wheel substrate to produce thereon a heating element for receiving an electrical current and providing a source of heat, said heating element being applied in a manner to provide a smooth outer surface while being applied to said non-uniform steering wheel substrate; and a second layer deposited over at least a portion of said heating element, wherein said electrically conductive layer comprises a silver plated copper pigment and a thermoplastic binder.

* * * * *